United States Patent
Wamprecht et al.

(10) Patent No.: US 12,479,966 B2
(45) Date of Patent: Nov. 25, 2025

(54) METHOD FOR PRODUCING THERMOPLASTIC POLYURETHANES

(71) Applicant: Covestro Deutschland AG, Leverkusen (DE)

(72) Inventors: Christian Wamprecht, Neuss (DE); Faisal Shafiq, Krefeld-Fischeln (DE); Rainer Bellinghausen, Odenthal (DE); Joerg Stein, Dormagen (DE); Peter Reichert, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 492 days.

(21) Appl. No.: 17/997,279

(22) PCT Filed: May 7, 2021

(86) PCT No.: PCT/EP2021/062163
§ 371 (c)(1),
(2) Date: Oct. 27, 2022

(87) PCT Pub. No.: WO2021/228715
PCT Pub. Date: Nov. 18, 2021

(65) Prior Publication Data
US 2023/0174733 A1    Jun. 8, 2023

(30) Foreign Application Priority Data

May 12, 2020 (EP) ...................... 20174032

(51) Int. Cl.
| | |
|---|---|
| *C08G 18/10* | (2006.01) |
| *B29C 71/02* | (2006.01) |
| *C08G 18/82* | (2006.01) |
| *C08J 5/18* | (2006.01) |
| *C08J 5/22* | (2006.01) |
| *B29B 9/06* | (2006.01) |
| *B29K 75/00* | (2006.01) |

(52) U.S. Cl.
CPC ............... *C08J 7/08* (2013.01); *C08G 18/10* (2013.01); *C08G 18/82* (2013.01); *C08J 5/18* (2013.01); *C08J 5/2256* (2013.01); *C08J 5/2287* (2013.01); *B29B 9/065* (2013.01); *B29K 2075/00* (2013.01); *C08J 2375/06* (2013.01); *C08J 2375/08* (2013.01)

(58) Field of Classification Search
CPC .......... C08J 5/2256; C08J 5/2287; C08J 7/08; C08G 18/10; C08G 18/82; B29B 9/065
See application file for complete search history.

(56) References Cited

U.S. PATENT DOCUMENTS

| | | | |
|---|---|---|---|
| 5,780,573 A | 7/1998 | Iwata et al. | |
| 2005/0043492 A1 | 2/2005 | Chin et al. | |
| 2009/0326108 A1* | 12/2009 | Kim | ........................ C08K 5/49 524/100 |
| 2012/0329892 A1* | 12/2012 | Prissok | ................ A43B 13/187 521/155 |

FOREIGN PATENT DOCUMENTS

| | | | |
|---|---|---|---|
| CN | 113561400 A | * | 10/2021 |
| DE | 1964834 A1 | | 7/1971 |
| DE | 2901774 A1 | | 7/1980 |
| DE | 10103424 A1 | | 8/2002 |
| EP | 0922552 A1 | | 6/1999 |
| GB | 1057018 A | | 2/1967 |
| JP | 3602668 B2 | | 12/2004 |
| WO | 2006072461 A1 | | 7/2006 |

OTHER PUBLICATIONS

CN-113561400-A_2021-10-29_English.*
Kunststoffe 68 (1978) 819.
Kautschuk, Gummi, Kunststoffe 35 (1982) 569.
Justus Liebigs Annalen der Chemie, 562, 1949, pp. 75 to 136.
International Search Report, PCT/EP2021/062163, date of mailing: Aug. 3, 2021, Authorized officer: Florian Paulus.

* cited by examiner

*Primary Examiner* — Michael L Leonard
(74) *Attorney, Agent, or Firm* — The Webb Law Firm

(57) ABSTRACT

The present invention relates to a process for the treatment of thermoplastic polyurethane, to the treated thermoplastic polyurethane and to the use thereof.

12 Claims, No Drawings

METHOD FOR PRODUCING THERMOPLASTIC POLYURETHANES

CROSS-REFERENCE TO RELATED APPLICATION

This application is a national stage application under 35 U.S.C. § 371 of PCT/EP2021/062163, filed May 7, 2021, which claims the benefit of European Application No. 20174032.1, filed May 12, 2020, each of which is incorporated herein by reference.

FIELD

The present invention relates to a process for the treatment of thermoplastic polyurethane, to the treated thermoplastic polyurethane and to the use thereof.

BACKGROUND

Thermoplastic polyurethanes (TPUs) enjoy wide use because they have good elastomer properties and can be readily thermoplastically further processed. Suitable selection of the components makes it possible to achieve a great breadth of variation in mechanical properties. An overview of TPU, its properties and applications are given, for example, in Kunststoffe 68 (1978)819, Kautschuk, Gummi, Kunststoffe 35 (1982) 569; G. Becker, D. Braun: Kunststoff-Handbuch, vol. 7 "Polyurethane" Munich, Vienna, Carl Hanser Verlag 1983. An overview of the various production methods is given by Plastikverarbeiter 40 (1989). The most important industrial methods for producing TPUs are the extruder method (DE 1 964 834) and the mixing head/belt method (GB 1,057,018).

TPUs are usually formed from linear polyols, such as polyester polyols, polyether polyols or polycarbonate polyols, organic diisocyanates and short-chain, usually difunctional alcohols (chain extenders). Alongside these, additives, catalysts, dyes and fillers may also be used. TPUs can be prepared batchwise or continuously.

After production, the TPUs are typically discharged from a reactive extruder in the form of polymer strands which are then cooled with water on a cooling belt and subsequently pelletized in a pelletizer (strand pelletization). Alternatively, the pelletization may also be effected in a pelletizer connected directly to the reactive extruder, with the pelletization being performed in the presence of cooling water (for example underwater pelletization). These process steps result in a certain amount of residual moisture still adhering to the resulting pellets, meaning that a drying operation is frequently necessary. To this end, the pellets can be dried in a downstream dryer. They may then be filled into the desired packaging.

However, this type of pellet treatment often leads to fluctuations in product quality as a result of the remaining presence of residual moisture and incompletely reacted reactive groups, especially isocyanate groups. These residual isocyanate groups may react with water molecules still present from the residual moisture in the pellets, with primary amino groups being formed with the elimination of carbon dioxide. These amino groups can no longer contribute to a further increase in molecular weight, meaning that envisioned final molecular weight of the TPU can no longer be achieved. This frequently has a negative impact on the level of mechanical properties of the TPU, this depending decisively on the molecular weight of the TPU. In a further possible reaction step, the amino groups may also react with minute amounts of free isocyanate groups that may be present to form urea groups. Compared to urethane groups, urea groups are groups having a much higher melting point, which in the course of TPU extrusion processing operations then often result in unmelted particles in films or sheets, which markedly reduces the quality thereof or even makes the extruded articles unusable.

SUMMARY

An object was therefore that of providing a process for the treatment of TPU which ensures the most complete possible chemical reaction of the TPU pellets prior to packaging in suitable packaging containers and hence the possibility of avoiding disadvantages, such as fluctuating product quality, e.g. poor extrusion quality and insufficient mechanical properties.

According to the invention, this object is achieved by a process for the treatment of thermoplastic polyurethane, characterized in that the treatment comprises the following steps:

I) providing the thermoplastic polyurethane (TPU-1) obtainable or obtained by reacting at least one polyisocyanate with at least one polyol, and II) subjecting the thermoplastic polyurethane (TPU-1) to a temperature in the range from 10° C. to 150° C. under a gas atmosphere, the gas of the gas atmosphere having a dew point of $\leq -10°$ C., to obtain a treated thermoplastic polyurethane (TPU-2).

It has surprisingly been found that thermoplastic polyurethane thus treated (TPU-2) has a reproducible product quality and reproducible mechanical properties, and also has chemically reacted virtually to completion. It has also surprisingly been found that the degree of polymerization is increased by the process according to the invention. It is essential to the invention that the thermoplastic polyurethane (TPU-1) is heat-treated under a gas atmosphere the gas of which has a dew point of $\leq -10°$ C.

DETAILED DESCRIPTION

In the context of the present invention, the word "a" in association with countable parameters should be understood to mean the number "one" only when this is stated explicitly (for instance by the expression "exactly one"). When reference is made hereinafter to "a polyol", for example, the word "a" should be regarded merely as the indefinite article and not the number "one", meaning that an embodiment comprising a mixture of at least two polyols is also encompassed.

According to the invention, the terms "comprising" or "containing" preferably mean "consisting essentially of" and particularly preferably mean "consisting of".

In the context of the invention, the thermoplastic polyurethane (TPU-1) may also be obtained or have been obtained by the reaction of two or more different polyisocyanates, preferably diisocyanates, with two or more different polyols. In the context of the invention, the thermoplastic polyurethane (TPU-1) may also be obtained or have been obtained by the reaction of two or more different polyisocyanates, preferably diisocyanates, with two or more different polyols and with one or more chain extenders, preferably diols having a molecular weight of less than or equal to 500 g/mol.

In a preferred embodiment of the process according to the invention, the thermoplastic polyurethane (TPU-1) prior to being provided in step I) has undergone a multi-stage process comprising the following steps:
  a) extruding the thermoplastic polyurethane (TPU-1),
  b) pelletizing the extruded thermoplastic polyurethane (TPU-1) from step a), and
  c) drying the thermoplastic polyurethane (TPU-1) from step b).

The reaction of the at least one polyisocyanate with the at least one polyol prior to the extrusion as per step a) may for example be effected in a reactive extruder, in a unit upstream of the extruder and equipped with static mixers, or in a mixing head. Preferably, both steps take place in a reactive extruder. The reaction and extrusion are carried out at temperatures in the range from 100° C. to 250° C. The pelletization is preferably effected by means of strand pelletization or underwater pelletization, wherein the extruded thermoplastic polyurethane (TPU-1) prior to pelletization is preferably cooled to less than 100° C. For example, vibrating screen extractors and centrifugal dryers may be used to dry the pelletized thermoplastic polyurethane.

The thermoplastic polyurethane (TPU-1) is produced using at least one polyol and at least one organic polyisocyanate, preferably at least one diisocyanate and optionally at least one short-chain diol (chain extender) as main formation components. In a preferred embodiment, the thermoplastic polyurethane (TPU-1) is obtained by reacting at least one polyisocyanate with at least one polyol and with at least one chain extender. In another preferred embodiment, the thermoplastic polyurethane (TPU-1) is obtained by reacting at least one diisocyanate with at least one polyol and with at least one chain extender.

The TPU formation reaction can be accelerated by additionally adding catalysts. Additives, auxiliaries and additional substances may be used to achieve certain resistances to weathering influences, UV light, hydrolysis, oxidation, abrasion, soiling and also for improving processing properties. Monofunctional chain terminators may optionally also be used. To adjust the properties, the formation components can be varied within relatively broad molar ratios. Molar ratios of polyols to chain extenders of from 1:1 to 1:12 have proven useful. This results in products having hardnesses in the range from 45 Shore A to 85 Shore D.

The thermoplastic polyurethane (TPU-1) can be produced by the known methods continuously, for example using reactive extruders or the belt method by the one-shot or prepolymer method, or discontinuously by the known prepolymer process. In these methods, the components being reacted are mixed with one another in succession or simultaneously, with the reaction starting immediately. In the extruder method, the formation components and optionally catalysts and/or further auxiliaries and additives are introduced into the extruder individually or as a mixture, reacted for example at temperatures from 100 to 280° C., preferably 140 to 250° C., and the resulting TPU is extruded, cooled and pelletized.

Suitable production processes for thermoplastic polyurethanes are disclosed for example in EP 0 922 552 A1, DE 101 03 424 A1 or WO 2006/072461 A1. Production is usually effected on a belt system or in a reactive extruder, but may also be carried out on the laboratory scale, for example in a manual casting method. Depending on the physical properties of the components these are all mixed with one another directly or individual components are premixed and/or prereacted, for example to give prepolymers, and only then subjected to polyaddition. In a further embodiment a thermoplastic polyurethane is first produced from the formation components, optionally together with catalyst, into which auxiliaries may optionally also be incorporated. Homogeneous distribution is preferably effected in an extruder, preferably in a twin-screw extruder.

To produce the thermoplastic polyurethanes according to the invention, the formation components are reacted preferably in the presence of catalysts and optionally auxiliaries and/or additives typically in amounts such that the equivalents ratio of NCO groups in the diisocyanates to the sum of the hydroxyl groups in the components used is 0.95 to 1.05:1, preferably 0.97 to 1.03:1, more preferably 0.98 to 1.02:1.

Suitable polyols are all polyols known to those skilled in the art, preferably linear hydroxyl-terminated polyols, having a number-average molecular weight (Mn) of 500 to 5000 g/mol. They are therefore frequently also referred to as "substantially linear polyols". Preference is given to polyester diols, polyether diols, polyether ester diols, polycaprolactone diols, polycarbonate diols, polyether carbonate diols or mixtures of these. The molecular weights of such polyols are typically calculated via their OH number (hydroxyl number), as is known to those skilled in the art. The OH number is determined titrimetrically in accordance with DIN 53240. The molar weight of polyols can be calculated from the OH number (OHN) by the following formula:

$$\mathrm{Mn} = 1000 \text{ mg/g} \cdot \frac{z \cdot 56.106 \text{ g/Mol}}{OHN \text{ [mg/g]}}$$

Here, z is the number of OH groups in the macromolecule. For a linear diol, z=2. For production reasons, these often contain small amounts of nonlinear compounds.

Suitable polyester diols may be prepared, for example, from dicarboxylic acids having 2 to 12 carbon atoms, preferably 4 to 6 carbon atoms, and polyhydric alcohols. Examples of useful dicarboxylic acids include: aliphatic dicarboxylic acids such as succinic acid, glutaric acid, adipic acid, suberic acid, azelaic acid and sebacic acid, and aromatic dicarboxylic acids such as phthalic acid, isophthalic acid and terephthalic acid. The dicarboxylic acids may be used individually or as mixtures, for example in the form of a succinic, glutaric and adipic acid mixture. To prepare the polyester diols, it may possibly be advantageous to use, instead of the dicarboxylic acids, the corresponding dicarboxylic acid derivatives such as carboxylic diesters having from 1 to 4 carbon atoms in the alcohol radical, carboxylic anhydrides or carbonyl chlorides. Examples of polyhydric alcohols are glycols having 2 to 12 and preferably 2 to 6 carbon atoms, such as ethylene glycol, diethylene glycol, butane-1,4-diol, pentane-1,5-diol, hexane-1,6-diol, decane-1,10-diol, dodecane-1,12-diol, 2,2-dimethylpropane-1,3-diol, propane-1,3-diol and dipropylene glycol. Depending on the desired properties, the polyhydric alcohols may be used alone or optionally in a mixture with one another. Also suitable are esters of carbonic acid with the stated diols, especially those having 4 to 6 carbon atoms, such as butane-1,4-diol and/or hexane-1,6-diol. Such esters of carbonic acid are also referred to as polycarbonate diols. Also suitable as esters are the condensation products of ω-hydroxycarbonic acids, for example ω-hydroxycaproic acids and preferably polymerization products of lactones, for example optionally substituted w-caprolactones. Polyester diols used with preference are ethanediol polyadipates, butane-1,4-diol polyadipates, ethanediol butane-1,4-diol polyadipates, hexane-1,6-diol neopentyl glycol polyadipates, hexane-1,6-diol butane-1,4-diol polyadipates and polycaprolactones. The polyester diols have a number-average molecular weight (Mn) of from 500 to 5000 g/mol, preferably 600 to 4000 g/mol and particularly preferably 800 to 3000 g/mol. They may be used singly or in the form of mixtures with one another. The molecular weights of such diols are usually calculated via their OH number, as explained above.

Suitable polyether diols may be prepared by reacting one or more alkylene oxides having 2 to 4 carbon atoms in the alkylene radical with a starter molecule containing two active hydrogen atoms in bonded form. Examples of alkylene oxides include: ethylene oxide, 1,2-propylene oxide, epichlorohydrin and 1,2-butylene oxide and 2,3-butylene oxide. Preference is given to using ethylene oxide, propylene oxide and mixtures of 1,2-propylene oxide and ethylene oxide. The alkylene oxides may be used singly, in alternating succession, or as mixtures. Examples of useful starter molecules include: water, amino alcohols such as N-alkyldiethanolamines, for example N-methyldiethanolamine, and diols such as ethylene glycol, propane-1,2-diol, propane-1,3-diol, butane-1,4-diol and hexane-1,6-diol. It is also optionally possible to use mixtures of starter molecules. Suitable polyetherols further include the hydroxyl-containing polymerization products of tetrahydrofuran. It is also possible to use trifunctional polyethers in proportions of 0 to 20% by weight based on the bifunctional polyethers, but at most in an amount such that a thermoplastically processable product is formed. The essentially linear polyether diols have a number-average molecular weight (Mn) of from 500 to 18 000 g/mol, preferably 750 to 12 000 and particularly preferably 900 to 4200 g/mol. They may be used either singly or in the form of mixtures with one another. The molecular weights of such diols are usually calculated via their OH number, as explained above.

Suitable polyether esters may be prepared, for example, by reaction of short-chain polyether diols such as polytetrahydrofurans having molecular weights of 250 to 1000 g/mol with organic dicarboxylic acids, such as succinic acid or adipic acid. The polyether ester diols have a number-average molecular weight (Mn) of from 600 g/mol to 5000 g/mol, preferably 700 to 4000 g/mol and particularly preferably 800 to 3000 g/mol. They may be used singly or in the form of mixtures with one another. The molecular weights of such diols are usually calculated via their OH number, as explained above.

Suitable polycarbonate diols may be prepared for example by reaction of short-chain diols, for example butane-1,4-diol or hexane-1,6-diol, with diphenyl carbonate or dimethyl carbonate with the aid of catalysts and with elimination of phenol or methanol. The polycarbonate diols have a number-average molecular weight (Mn) of from 500 to 6000 g/mol, preferably 750 to 4000 g/mol and particularly preferably 800 to 3000 g/mol. The molecular weights of such diols are usually calculated via their OH number, as explained above. They may be used singly or in the form of mixtures with one another.

Suitable polyether carbonate diols may, for example, be prepared by reaction of short-chain polyether diols such as polytetrahydrofurans having molecular weights of from 250 to 1000 g/mol with diphenyl or dimethyl carbonate with the aid of catalysts and with elimination of phenol or methanol. Polyether carbonate diols may moreover be prepared by copolymerization of alkylene oxides, e.g. ethylene oxide or propylene oxide or mixtures thereof, with carbon dioxide with the aid of suitable catalysts, e.g. double metal cyanide catalysts. The polyether carbonate diols have a number-average molecular weight (Mn) of from 500 to 8000 g/mol, preferably 750 to 6000 g/mol and particularly preferably 1000 to 4500 g/mol. The molecular weights of such diols are usually calculated via their OH number, as explained above.

Useful polyisocyanates, preferably organic diisocyanates, for example include aliphatic, cycloaliphatic, araliphatic, heterocyclic and aromatic diisocyanates, as described for example in Justus Liebigs Annalen der Chemie, 562, pages 75 to 136. It is immaterial here whether the polyisocyanates and diisocyanates have been obtained by means of phosgenation or by a phosgene-free process. The polyisocyanates and diisocyanates and/or the precursor compounds thereof may have been obtained from fossil or biological sources. Preference is given to preparing 1,6-diisocyanatohexane (HDI) from hexamethylene-1,6-diamine and 1,5-diisocyanatopentane from pentamethylene-1,5-diamine, the hexamethylene-1,6-diamine and the pentamethylene-1,5-diamine having been obtained from biological sources, preferably by bacterial fermentation.

Specific examples include: aliphatic diisocyanates such as hexamethylene 1,6-diisocyanate, pentamethylene 1,5-diisocyanate and decane 1,10-diisocyanate, cycloaliphatic diisocyanates such as isophorone diisocyanate, cyclohexane 1,4-diisocyanate, 1-methylcyclohexane 2,4- and 2,6-diisocyanate and the corresponding isomer mixtures, dicyclohexylmethane 4,4'-, 2,4'- and 2,2'-diisocyanate and the corresponding isomer mixtures, and aromatic diisocyanates such as tolylene 2,4-diisocyanate, mixtures of tolylene 2,4- and 2,6-diisocyanate, diphenylmethane 4,4'-diisocyanate, diphenylmethane 2,4'-diisocyanate and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates and/or diphenylmethane 2,4'-diisocyanates, 4,4'-diisocyanato-1,2-diphenylethane and naphthylene 1,5-diisocyanate. Preference is given to using hexamethylene 1,6-diisocyanate, isophorone diisocyanate, dicyclohexylmethane 4,4'-diisocyanate, diphenylmethane diisocyanate isomer mixtures having a diphenylmethane 4,4'-diisocyanate content of greater than 96% by weight and especially diphenylmethane 4,4'-diisocyanate and naphthylene 1,5-diisocyanate. These diisocyanates may be used singly or in the form of mixtures with one another. They may also be used together with up to 15% (based on total diisocyanate) but at most an amount of polyisocyanate so as to result in a product that is thermoplastically processable. Examples are triphenylmethane 4,4',4''-triisocyanate and polyphenylpolymethylene polyisocyanates.

Short-chain chain extenders that may be used are diols or diamines having a molecular weight of 60 to 500, preferably aliphatic diols having 2 to 14 carbon atoms, for example ethanediol, propane-1,3-diol, pentane-1,5-diol, hexane-1,6-diol, octane-1,8-diol, decane-1,10-diol, dodecane-1,12-diol, diethylene glycol, dipropylene glycol and especially butane-1,4-diol. Also suitable, however, are diesters of terephthalic acid with glycols having 2 to 4 carbon atoms, for example bis(ethylene glycol) terephthalate or bis(butane-1,4-diol) terephthalate, hydroxyalkylene ethers of hydroquinone, for example 1,4-di(β-hydroxyethyl)hydroquinone, ethoxylated bisphenols, for example 1,4-di(β-hydroxyethyl)bisphenol A, (cyclo)aliphatic diamines, for example isophoronediamine, ethylenediamine, propylene-1,2-diamine, propylene-1,3-diamine, N-methylpropylene-1,3-diamine, N,N'-dimethylethylenediamine and aromatic diamines such as for example tolylene-2,4-diamine and tolylene-2,6-diamine, 3,5-diethyltolylene-2,4-diamine and/or 3,5-diethyltolylene-2,6-diamine and primary mono-, di-, tri- and/or tetraalkyl-substituted 4,4'-diaminodiphenylmethanes. Mixtures of the abovementioned chain extenders can also be employed. In addition, relatively small amounts of triols may also be added, but at most an amount of triol so as to result in a product that is thermoplastically processible.

Catalysts that may be used include the customary catalysts known from polyurethane chemistry. Suitable catalysts are the customary tertiary amines known per se, for example triethylamine, dimethylcyclohexylamine, N-methylmorpholine, N,N'-dimethylpiperazine, 2-(dimethylaminoethoxy)ethanol, diazabicyclo[2.2.2]octane and the like, and also in particular organic metal compounds such as titanium compounds, iron compounds, bismuth compounds, zinc compounds, zirconium compounds, tin compounds, for example tin diacetate, tin dioctoate, tin dilaurate or the dialkyltin salts of aliphatic carboxylic acids such as dibutyltin diacetate, dibutyltin dilaurate or the like. Preferred catalysts are organic metal compounds, in particular titanic esters, bismuth compounds, zirconium compounds, iron compounds or tin compounds. Very particular preference is given to dibutyltin dilaurate, tin dioctoate and titanic esters.

Additives, auxiliaries and additions that may be used are for example lubricants, such as fatty acid esters, metal soaps thereof, fatty acid amides and silicone compounds, anti-blocking agents, inhibitors, stabilizers against hydrolysis, light, heat and discoloration, flame retardants, dyes, pigments, inorganic or organic fillers, nucleating agents and reinforcers. Reinforcers are especially fibrous reinforcing materials such as inorganic fibers, which are produced according to the prior art and may also be sized. Further details of the auxiliaries and additives mentioned can be found in the specialist literature, for example J. H. Saunders, K. C. Frisch: "High Polymers", volume XVI, Polyurethanes, parts 1 and 2, Interscience Publishers 1962 and 1964, R. Gachter, H. Müller (eds.): Taschenbuch der Kunststoff-Additive [Handbook of Plastics Additives], 3rd edition, Hanser Verlag, Munich 1989, or DE-A 29 01 774.

Monofunctional chain terminators which may be used include monoalcohols, such as for example 1-butanol, 1-hexanol, 1-octanol and stearyl alcohol, or monoamines, such as for example 1-butylamine or stearylamine, to set a particular TPU molecular weight. In some cases these also serve as demolding aids.

A gas atmosphere having a gas with a dew point of ≤−10° C. can be achieved by dehumidifying or humidifying gas depending on the dew point that the gas has prior to treatment. The dew point of the gas can be determined, for example, using a dew-point mirror hygrometer. The gas can be dehumidified using a very wide variety of dryers, for example using condensation dryers or absorption dryers. The use of rotary dehumidifiers as adsorption dryers has proven to be particularly effective. The moist gas stream is passed through a rotating sorption wheel coated with adsorbent and thus dried. On the opposite side, the wheel is regenerated to effectively ensure the continuous treatment of the gas to be dried. By augmenting the plant technology, for example with precooler and aftercooler modules, dew points down to −65° C. and hence a relative process gas humidity of 0.05% can be achieved. The dew point of the gas atmosphere can be set as a desired dew point directly at the adsorption dryer. The adsorption dryer then operates continuously, generating a process gas having the selected dew point. Adsorption dryers have specific functions, for example drying is effected until a fixed dew point (° C.) is reached, which is measured using external sensors connected to the device.

In a preferred embodiment of the process according to the invention, the gas of the gas atmosphere has a dew point of ≤−15° C., preferably of ≤−20° C., and particularly preferably of ≤−25° C. In a further preferred embodiment of the process according to the invention, the gas has a dew point in the range from −10° C. to −40° C., preferably in the range from −15° C. to −35° C. and particularly preferably in the range from −20° C. to −30° C.

In a preferred embodiment of the process according to the invention, the thermoplastic polyurethane (TPU-1) is subjected to the temperature for a period of from 1 hour to 12 hours, preferably a period of from 2 hours to 10 hours, particularly preferably a period of from 3 hours to 9 hours, very particularly preferably a period of from 4 hours to 8 hours and more preferably still a period of from 4 hours to 7 hours under gas atmosphere.

In a preferred embodiment of the process according to the invention, the gas of the gas atmosphere is air, an inert gas, or a mixture of air and an inert gas, wherein the inert gas is preferably selected from the group consisting of nitrogen, carbon dioxide, argon and/or a mixture of at least two of these.

In a preferred embodiment of the process according to the invention, the dew point of the gas of the gas atmosphere in step II) is kept constant on entry into the apparatus. Preferably, the dew point of the gas of the gas atmosphere in step II) and the dew point of the gas of the gas atmosphere in the hose and/or the pipeline via which the thermoplastic polyurethane (TPU-1) is supplied to the apparatus for step II) is essentially constant, i.e. the gas atmosphere in the apparatus for step II) and the supplying means (hose and/or pipe) has an essentially constant dew point at the temperature established in the apparatus.

This has the advantage that the thermoplastic polyurethane (TPU-2) has even better product consistency. The positive impact of this is noticeable in particular after of processing (TPU-2) in the mechanical properties and the extrusion quality of extruded sheets and films.

In a preferred embodiment of the process according to the invention, the pressure of the gas atmosphere is in the range from 0.01 bar absolute to 5.0 bar absolute, preferably in the range from 0.1 bar absolute to 4.5 bar absolute and particularly preferably 0.2 bar to 3.5 bar absolute. "Bar absolute" in the context of the invention means the measured pressure relative to zero pressure in empty space (vacuum).

In a preferred embodiment of the process according to the invention, the thermoplastic polyurethane (TPU-1) is subjected to a temperature in the range from 20° C. to 150° C., preferably in the range from 25° C. to 130° C., particularly preferably in the range from 30° C. to 110° C. and very particularly preferably in the range from 30° C. to 100° C. under a gas atmosphere.

The process according to the invention for the treatment of thermoplastic polyurethane is for example conducted in an apparatus such as a silo, a vessel or a drying cabinet. For example, the thermoplastic polyurethane (TPU-1), after pelletization and drying in a downstream dryer, can be conveyed by conveying conduits into, for example, a silo and heat-treated for a plurality of hours with circulation at temperatures from 10 to 100° C. in the presence of air which has been supplied via pipelines to the silo with a previously established, preferably constant, dew point of ≤−10° C. It is advantageous in this case when a gas with a previously established, preferably constant, dew point of ≤−10° C. is also used for the transport of the thermoplastic polyurethane (TPU-1) through the transport conduits to the apparatus, for example a heat-treatment silo. For example, the thermoplastic polyurethane (TPU-1) may for example be moved and conveyed by an air stream which is either caused by application of a vacuum to a transport conduit, resulting in an air stream having a previously established dew point of ≤−10° C. entering the conduit, or is caused by compressed air.

In a preferred embodiment of the process according to the invention, step II) is effected in an apparatus, wherein the apparatus is preferably a vessel or silo.

In a preferred embodiment of the process according to the invention, the thermoplastic polyurethane (TPU-1) is supplied to the apparatus for step II) via a hose and/or a pipeline, preferably wherein the hose and/or the pipeline each comprise a gas atmosphere and the gas of the gas atmosphere has a dew point of ≤−10° C., particularly preferably wherein the hose and/or the pipeline each have a temperature in the range from 10° C. to 100° C. and comprise a gas atmosphere and the gas of the gas atmosphere has a dew point of ≤−10° C. This has the advantage that the pre-dried thermoplastic polyurethane (TPU-1) no longer comes into contact with moisture and/or fluctuating ambient conditions during transport into the apparatus of step II) and therefore fluctuating product qualities and hence a loss of quality as a result of uncontrolled side reactions no longer occur. Such a loss of quality can be observed in particular when the dew point of the gas atmosphere fluctuates strongly and/or is above −10° C., that is to say in the absence of constant ambient conditions, as is caused for example by the seasonal influence of the weather at the production site.

In a preferred embodiment of the process according to the invention, the apparatus, the hose, the pipeline and/or the gas atmosphere have a temperature in the range from 10° C. to 100° C.

In a further preferred embodiment of the process according to the invention, the pressure of the gas atmosphere in the apparatus, the hose and/or the pipeline is constant.

In a preferred embodiment of the process according to the invention, the gas of the gas atmosphere flows around, preferably circulates around, the thermoplastic polyurethane (TPU-1 and TPU-2). This has the advantage that the thermoplastic polyurethane is heated uniformly and has a uniform heat distribution. The circulation prevents dead spaces from forming between the thermoplastic polyurethane (TPU-1 and TPU-2), especially the thermoplastic polyurethane pellets, and uniform and efficient drying can therefore be ensured. Furthermore, the circulation prevents individual thermoplastic polyurethane pellets from sticking to one another and there is therefore no clumping of thermoplastic polyurethane pellets.

In a preferred embodiment of the process according to the invention, the ratio of the volume of the gas of the gas atmosphere to the volume of the thermoplastic polyurethane (TPU-1) is in the range from 1 to 1000, preferably in the range from 1.5 to 500, and particularly preferably in the range from 2 to 100. In a further preferred embodiment of the process according to the invention, the ratio of the volume of the gas of the gas atmosphere to the volume of the thermoplastic polyurethane (TPU-1 and TPU-2) is in the range from 1 to 1000, preferably in the range from 1.5 to 500, and particularly preferably in the range from 2 to 100.

In a preferred embodiment of the process according to the invention, the NCO group content of the thermoplastic polyurethane (TPU-2) is at least 30%, preferably at least 40% and particularly preferably at least 50% lower than the NCO group content of the thermoplastic polyurethane (TPU-1), the NCO group content being determined in accordance with DIN EN ISO 14896. In a further preferred embodiment of the process according to the invention, the NCO group content of the thermoplastic polyurethane (TPU-2) is at least 30%, preferably at least 40% and particularly preferably at least 50% lower, after the thermoplastic polyurethane has been subjected to a temperature in the range from 10° C. to 100° C. under a gas atmosphere, relative to the NCO group content of the thermoplastic polyurethane (TPU-1) before it has been subjected to a temperature in the range from 10° C. to 100° C. under a gas atmosphere, the NCO group content being determined in accordance with DIN EN ISO 14896. In accordance with DIN EN ISO 14896 (01. 2009) means that this procedure was conducted with the following differences: Instead of toluene, N-methylpyrrolidone is used as solvent. The concentration of dibutylamine and hydrochloric acid is 0.5 mol/l. Dibutylamine is dissolved in dimethyl sulfoxide instead of in toluene. The hydrochloric acid is not dissolved in water but instead in a mixture of 85% isopropanol and 15% water.

In a preferred embodiment of the process according to the invention, the thermoplastic polyurethane (TPU-1) is subjected to a temperature in the range from 20° C. to 100° C., preferably in the range from 30° C. to 100° C., particularly preferably in the range from 50° C. to 100° C. and very particularly preferably in the range from 50° C. to 90° C. under a gas atmosphere.

In a preferred embodiment of the process according to the invention, the thermoplastic polyurethane (TPU-1 and/or TPU-2) is in the form of pellets and has an average size in the range from 2 mm to 8 mm, preferably in the range from 3 mm to 7 mm, and particular preferably in the range from 3.5 mm to 6.5 mm.

In a preferred embodiment of the process according to the invention, the thermoplastic polyurethane (TPU-1 and/or TPU-2) is in the form of pellets and has a surface area in the range from 12 mm$^2$ to 201 mm$^2$, preferably in the range from 28 mm$^2$ to 154 mm$^2$, and particular preferably in the range from 38 mm$^2$ to 133 mm$^2$.

In a preferred embodiment of the process according to the invention, the thermoplastic polyurethane (TPU-1 and/or TPU-2) in the case of spherical pellets has a diameter in the range from 2 mm to 8 mm, and in the case of strand-form pellets has a diameter in the range from 1 mm to 7.5 mm.

In a preferred embodiment of the process according to the invention, the treatment comprises the following steps:
I) providing the thermoplastic polyurethane (TPU-1) obtainable or obtained by reacting at least one polyisocyanate with at least one polyol, and
II) subjecting the thermoplastic polyurethane (TPU-1) to a temperature in the range from 10° C. to 100° C. under a gas atmosphere for a period of from 1 hour to 12 hours, the gas of the gas atmosphere having a dew point of ≤−10° C., to obtain a treated thermoplastic polyurethane (TPU-2).

In a preferred embodiment of the process according to the invention, the treatment comprises the following steps:
I) providing the thermoplastic polyurethane (TPU-1) obtainable or obtained by reacting at least one polyisocyanate with at least one polyol, and
II) subjecting the thermoplastic polyurethane (TPU-1) to a temperature in the range from 10° C. to 100° C. under a gas atmosphere for a period of from 1 hour to 12 hours in a silo, the gas of the gas atmosphere having a dew point of ≤−10° C., to obtain a treated thermoplastic polyurethane (TPU-2).

In a preferred embodiment of the process according to the invention, the treatment comprises the following steps:
I) providing the thermoplastic polyurethane (TPU-1) obtainable or obtained by reacting at least one polyisocyanate with at least one polyol, and II) subjecting the thermoplastic polyurethane (TPU-1) to a temperature in the range from 50° C. to 90° C. under a gas atmosphere for a period of from 1 hour to 12 hours, the gas of the gas atmosphere having a dew point in the range from −15° C. to −35° C., to obtain a treated thermoplastic polyurethane (TPU-2).

In a preferred embodiment of the process according to the invention, the treatment comprises the following steps:
I) providing the thermoplastic polyurethane (TPU-1) obtainable or obtained by reacting at least one polyisocyanate with at least one polyol, and
II) subjecting the thermoplastic polyurethane (TPU-1) to a temperature in the range from 50° C. to 90° C. under a gas atmosphere for a period of from 1 hour to 12 hours in a silo, the gas of the gas atmosphere having a dew point in the range from −15° C. to −35° C., to obtain a treated thermoplastic polyurethane (TPU-2).

The invention further provides a thermoplastic polyurethane (TPU-2) obtained or obtainable by the process according to the invention.

The invention further provides the thermoplastically processable polyurethanes (TPU-2) produced by the continuous process according to the invention and the use of same for the production of moldings by means of injection molding, and also the production of films, sheets, hoses, pipes and cable sheathings by means of extrusion and the production of coatings by means of calendering.

The invention further provides for the use of the thermoplastic polyurethane (TPU-2) according to the invention for the production of a composition, a thermoplastic molding compound, a molded article, a sheet, a film and/or a fiber.

The invention further provides for the use of the process according to the invention for the production of thermoplastic polyurethane (TPU-2).

The invention further provides for the use of the process according to the invention for the conversion of thermoplastic polyurethane (TPU-1) into thermoplastic polyurethane (TPU-2).

The invention further provides for the use of the process according to the invention for the treatment of thermoplastic polyurethane (TPU-1).

Further embodiments of the present invention can be gathered from the claims and the examples. It will be appreciated that the above-elucidated features of the article/process according to the invention and of the uses according to the invention can be used not only in the respectively indicated combination but also in other combinations without departing from the scope of the invention. Thus, for example, the combination of a preferred feature with a particularly preferred feature, or of a feature that is not further characterized with a particularly preferred feature, etc., is also implicitly included even when this combination is not explicitly mentioned.

The following examples serve to illustrate the invention but are in no way restrictive with respect to the subject matter of the present invention.

EXAMPLES

TPU Products Used
Desmopan 385S: aromatic, ester-based thermoplastic polyurethane from Covestro AG with a Shore A hardness of 85
Desmopan 2590A: aromatic, ester-based thermoplastic polyurethane from Covestro AG with a Shore A hardness of 90
Desmopan 192A: aromatic, ester-based thermoplastic polyurethane from Covestro AG with a Shore A hardness of 92
Desmopan 85085A: aliphatic, ester- and ether-based thermoplastic polyurethane from Covestro AG with a Shore A hardness of 85
Desmopan 9370AU: aromatic, ether-based thermoplastic polyurethane from Covestro AG with a Shore A hardness of 70
Desmopan 6080A: aromatic, ether-based thermoplastic polyurethane from Covestro AG with a Shore A hardness of 80
Desmopan 9665DU: aromatic, ether-based thermoplastic polyurethane from Covestro AG with a Shore D hardness of 65

To assess the influence of the conveying and drying air used on the properties of the respective TPU products, samples were taken immediately after the production, pelletization (strand pelletization or underwater pelletization, indicated in the following experiments) and subsequent pre-drying by means of a vibrating screen extractor or a centrifugal dryer (the nature of the pre-drying is indicated in the following experiments). The TPU samples were then dried for 30 minutes at 110° C., on the one hand with ambient air, the humidity of which fluctuates depending on the external climatic conditions, and on the other hand with dry air (dew point −25° C.). The dry air with a constant dew point of −25° C. was generated with a rotary dehumidifier. This involved passing the moist input gas stream (air stream) through a rotating sorption wheel coated with adsorbent and drying it in this way. The dew point of the gas (the air stream) at the exit of the rotary dehumidifier, i.e. after drying, was continuously measured by sensors so that the gas had a constant dew point at all times. A dry air dryer from Helios, on the one hand, and a "Turb etuve" circulating air dryer from Cerco-Semip, on the other, were used to dry the samples. The Helios dryer operated using dry air, with a constant dew point of −25° C. An air volume of 250 l/min was selected for drying the pellet samples. For drying, the Turb Etuve dryer from Cerco-Semip uses ambient air heated by a heating coil. A fan is used for circulating the air. In each case, 1 kg of sample was dried at 110° C. for 30 minutes. In both dryers, the respective air flowed around the respective pellets under standard pressure (1013.25 hPa). After drying, the NCO contents, the solution viscosities, the melt flow index (MVR), and the mechanical properties of the TPU samples were determined. In addition, the molecular weight distribution of some samples was determined by means of gel permeation chromatography. The corresponding values before drying were not determined because the starting sample for both drying methods was the same. Only the NCO content was determined before drying in order to determine the decrease as a result of the drying.

Test Conditions:
Tensile Test:
The tensile test was carried out on S1 bars [corresponds to type 5 test specimens in accordance with EN ISO 527-1 (02. 2012), stamped out from injection-molded slabs] or as directly injection molded bars in accordance with DIN 53504 (03. 2017) at a pulling rate of 200 mm/min.

Melt Flow Index (MVR)
Depending on the product, the MVR measurements were carried out at different temperatures under an applied weight of 10 kg (98 N) and with a preheating time of 5 min. in accordance with ISO 1133 (06. 2005) using an MVR instrument from Göttfert, model MP-D. The measurement temperatures are given in the following tables for the respective products.

Solution Viscosity

The solution viscosity was measured with a type 50110 Ubbelohde viscometer in accordance with DIN 51562-1 (01. 1999). 99.7 g of N-methyl-2-pyrrolidone with 0.1% dibutylamine and 0.4 g of TPU pellets were weighed out. The samples were stirred on a magnetic stirrer for about 1 hour at about 70° C. and cooled to room temperature overnight. The samples and a blank value (pure solvent) were measured at 25° C. on a Schott viscosity measuring station. The relative solution viscosity is calculated from the time (solution) divided by the time (solvent). The Schott viscosity measuring station consists of: AVS 400 viscosity measuring station, ASV/S measurement stand, glass thermostat, type 50110 Ubbelohde viscometer.

Nco Content:

In Accordance with DIN EN ISO 14896 (01. 2009) with the Following Differences:

Instead of toluene, N-methylpyrrolidone is used as solvent. The concentration of dibutylamine and hydrochloric acid is 0.5 mol/l. Dibutylamine is dissolved in dimethyl sulfoxide instead of in toluene. The hydrochloric acid is not dissolved in water but instead in a mixture of 85% isopropanol and 15% water.

Molecular Weights

The number-average molecular weights Mn and weight-average molecular weights Mw of the thermoplastic polyurethanes were determined, dissolved in HFIP (hexafluoroisopropanol), by means of GPC. The molecular weight was determined using a column combination of a precolumn and 3 consecutive GPC columns 30×8 mm. 1000 Å PSS PFG 7µ, 300 Å PSS PFG 7µ and 100 Å PSS PFG 7µ. Flow rate: 1 ml/min HFIP (fluorochem, 99.9%) with potassium trifluoroacetate from Aldrich, 98%, (3 g to 400 ml)), Knauer Smartline 2300 RI detector. 100 µl of sample solution, concentration 2 mg/ml, are injected. The samples are passed through a 0.45 µm PTFE filter prior to measurement. Measurements are taken at room temperature, calibrated with a PMMA standard kit from PSS (from 102-981 000 g/mol at the peak maximum). As comparison gas, ambient air was used in the experiments. During the measurement period, the ambient air had a dew point of 17.2° C., with a relative humidity of 84%, at a pressure of 1014 hPa and a temperature of 20° C., the absolute humidity was 14.5 g/m³. During the measurement period, the dry process air, referred to as dry air, had a dew point of −25° C., with a relative humidity of 3.4%, at a pressure of 1014 hPa and a temperature of 20° C., the absolute humidity was 0.6 g/m³.

Example 1: Desmopan 2590A: Production in a Reactive Extruder, Underwater Pelletization, Pre-Drying Using a Centrifugal Dryer The TPU sample was divided and one portion of the TPU sample was heat-treated with ambient air and the other portion of the TPU sample was heat-treated with dry air, as described above.

Results:

TABLE 1

Results of the heat-treatment of Desmopan 2590A with ambient air and dry air. Pd refers to the polydispersity, obtained by dividing Mw by Mn.

| Heat treatment with | Residual NCO content [% by wt.] | Solution viscosity | MVR (190° C.) [ml/10 min] | 100% modulus [MPa] | Breaking strength [MPa] | Elongation at break [%] | GPC molecular weight distribution | | |
|---|---|---|---|---|---|---|---|---|---|
| | | | | | | | Mn | Mw | Pd |
| Before heat treatment | 0.132 | | | | | | | | |
| Ambient air | 0.012 | 1.472 | 18.6 | 11.9 | 40.1 | 448 | 63540 | 125200 | 1.97 |
| Dry air | 0.007 | 1.487 | 14.8 | 11.5 | 43.2 | 474 | 72660 | 138300 | 1.90 |

It can clearly be seen that a slightly higher solution viscosity, a lower MVR value and higher breaking strength are obtained in the case of heat treatment with dry air. This points to a linear increase in the molar weight during heat treatment. The residual NCO content decreases considerably after heat treatment compared to the initial value and is at a similar level after both types of heat treatment. Since the use of dry air during the heat treatment results in a higher solution viscosity and a higher breaking strength, the reduction in the residual NCO content can be attributed to a linear molecular weight increase. In the case of the reduction in the residual NCO content after the heat treatment with ambient air, some of the NCO groups must accordingly also have reacted with water, which is undesirable. This is also demonstrated by the results of the GPC molar weight distribution, with a higher molar weight of the sample that was heat-treated with dry air.

Example 2: Desmopan 385S: Production in a Reactive Extruder, Pelletization by Means of Strand Pelletization and Pre-Drying by Means of Vibrating Screen Extractor The TPU sample was divided and one portion of the TPU sample was heat-treated with ambient air and the other portion of the TPU sample was heat-treated with dry air, as described above.

Results:

TABLE 2

Results of the heat-treatment of Desmopan 385S with ambient air and dry air.

| Heat treatment with | Residual NCO content [% by wt.] | Solution viscosity | MVR (200° C.) [ml/10 min] | 100% modulus [MPa] | Breaking strength [MPa] | Elongation at break [%] |
|---|---|---|---|---|---|---|
| Before heat treatment | 0.186 | | | | | |
| Ambient air | 0.065 | 1.48 | 19 | 5.1 | 45.8 | 649 |
| Dry air | 0.068 | 1.56 | 13 | 5.1 | 51.2 | 527 |

It can clearly be seen that a higher solution viscosity, a lower MVR value and higher breaking strength are obtained in the case of heat treatment with dry air. This points to a linear increase in the molar weight during heat treatment. The residual NCO content decreases considerably after heat treatment compared to the initial value and is at a similar level after both types of heat treatment. Since the use of dry air during the heat treatment results in a higher solution viscosity and a higher breaking strength, the reduction in the residual NCO content can be attributed to a linear molecular weight increase. In the case of the reduction in the residual NCO content after the heat treatment with ambient air, some of the NCO groups must accordingly also have reacted with water, which is undesirable.

Example 3: Desmopan 192: Production in a Reactive Extruder, Pelletization by Means of Strand Pelletization and Pre-Drying by Means of Vibrating Screen Extractor The TPU sample was divided and one portion of the TPU sample was heat-treated with ambient air and the other portion of the TPU sample was heat-treated with dry air, as described above.

Results:

TABLE 3

Results of the heat-treatment of Desmopan 192 with ambient air and dry air. Pd refers to the polydispersity, obtained by dividing Mw by Mn.

| Heat treatment with | Residual NCO content [% by wt.] | Solution viscosity | MVR (190° C.) [ml/10 min] | 100% modulus [MPa] | Breaking strength [MPa] | Elongation at break [%] | GPC molecular weight distribution | | |
|---|---|---|---|---|---|---|---|---|---|
| | | | | | | | Mn | Mw | Pd |
| Before heat treatment | 0.223 | | | | | | | | |
| Ambient air | 0.073 | 1.476 | 32.2 | 9.0 | 52.6 | 611 | 97030 | 246200 | 2.11 |
| Dry air | 0.092 | 1.503 | 25.2 | 9.2 | 55.8 | 605 | 116800 | 207700 | 2.14 |

It can clearly be seen that a higher solution viscosity, a lower MVR value and higher breaking strength are obtained in the case of heat treatment with dry air. This points to a linear increase in the molar weight during heat treatment. The residual NCO content decreases considerably after heat treatment compared to the initial value and is below 0.1% after both types of heat treatment. Since the use of dry air during the heat treatment results in a higher solution viscosity and a higher breaking strength, the reduction in the residual NCO content can be attributed to a linear molecular weight increase. In the case of the reduction in the residual NCO content after the heat treatment with ambient air, some of the NCO groups must accordingly also have reacted with water, which is undesirable. This is also demonstrated by the results of the GPC molar weight distribution, with a higher molar weight of the sample that was heat-treated with dry air.

Example 4: Desmopan 85085A: Production in a Reactive Extruder, Underwater Pelletization, Pre-Drying Using a Centrifugal Dryer The TPU sample was divided and one portion of the TPU sample was heat-treated with ambient air and the other portion of the TPU sample was heat-treated with dry air, as described above.

Results:

TABLE 4

Results of the heat-treatment of Desmopan 85085A with ambient air and dry air. Pd refers to the polydispersity, obtained by dividing Mw by Mn.

| Heat treatment with | Residual NCO content [% by wt.] | Solution viscosity | MVR (180° C.) [ml/10 min] | 100% modulus [MPa] | Breaking strength [MPa] | Elongation at break [%] | GPC molar weight distribution | | |
|---|---|---|---|---|---|---|---|---|---|
| | | | | | | | Mn | Mw | Pd |
| Before heat treatment | 0.226 | | | | | | | | |
| Ambient air | 0.087 | 1.52 | 49 | 6.2 | 37.8 | 918 | 123470 | 244200 | 1.98 |
| Dry air | 0.065 | 1.71 | 32 | 6.4 | 50.0 | 846 | 223820 | 427500 | 1.91 |

It can clearly be seen that a higher solution viscosity, a lower MVR value and higher breaking strength are obtained in the case of heat treatment with dry air. This points to a linear increase in the molar weight during heat treatment. The residual NCO content decreases considerably after heat treatment compared to the initial value and is at a similar level after both types of heat treatment. Since the use of dry air during the heat treatment results in a higher solution viscosity and a higher breaking strength, the reduction in the residual NCO content can be attributed to a linear molecular weight increase. In the case of the reduction in the residual NCO content after the heat treatment with ambient air, some of the NCO groups must accordingly also have reacted with water, which is undesirable. This is also demonstrated by the results of the GPC molar weight distribution, with a higher molar weight of the sample that was heat-treated with dry air.

Example 5: Desmopan 9370AU: Production in a Reactive Extruder, Pelletization by Means of Strand Pelletization and Pre-Drying by Means of Vibrating Screen Extractor The TPU sample was divided and one portion of the TPU sample was heat-treated with ambient air and the other portion of the TPU sample was heat-treated with dry air, as described above.

Results:

TABLE 5

Results of the heat-treatment of Desmopan 9370AU with ambient air and dry air.

| Heat treatment with | Residual NCO content before heat treatment [% by wt.] | Solution viscosity | MVR (190° C.) [ml/10 min] | 100% modulus [MPa] | Breaking strength [MPa] | Elongation at break [%] |
|---|---|---|---|---|---|---|
| Before heat treatment | 0.188 | | | | | |
| Ambient air | 0.072 | 1.41 | 30 | 2.7 | 27.2 | 836 |
| Dry air | 0.068 | 1.44 | 20 | 2.8 | 31.3 | 787 |

It can clearly be seen that a slightly higher solution viscosity, a lower MVR value and higher breaking strength are obtained in the case of heat treatment with dry air. This points to a linear increase in the molar weight during heat treatment. The residual NCO content decreases considerably after heat treatment compared to the initial value and is at a similar level after both types of heat treatment. Since the use of dry air during the heat treatment results in a higher solution viscosity and a higher breaking strength, the reduction in the residual NCO content can be attributed to a linear molecular weight increase. In the case of the reduction in the residual NCO content after the heat treatment with ambient air, some of the NCO groups must accordingly also have reacted with water, which is undesirable.

Example 6: Desmopan 6080A: Production in a Reactive Extruder, Pelletization by Means of Strand Pelletization and Pre-Drying by Means of Vibrating Screen Extractor The TPU sample was divided and one portion of the TPU sample was heat-treated with ambient air and the other portion of the TPU sample was heat-treated with dry air, as described above.

Results:

TABLE 6

Results of the heat-treatment of Desmopan 6080A with ambient air and dry air. Pd refers to the polydispersity, obtained by dividing Mw by Mn.

| Heat treatment with | Residual NCO content [% by wt.] | Solution viscosity | MVR (190° C.) [ml/10 min] | 100% modulus [MPa] | Breaking strength [MPa] | Elongation at break [%] | GPC molecular weight distribution | | |
|---|---|---|---|---|---|---|---|---|---|
| | | | | | | | Mn | Mw | Pd |
| Before heat treatment | 0.330 | | | | | | | | |
| Ambient air | 0.143 | 1.404 | 25.8 | 5.9 | 23.9 | 672 | 159100 | 369500 | 2.32 |
| Dry air | 0.144 | 1.468 | 11.3 | 6.0 | 26.8 | 552 | 226600 | 602700 | 2.66 |

It can clearly be seen that a higher solution viscosity, a lower MVR value and higher breaking strength are obtained in the case of heat treatment with dry air. This points to a linear increase in the molar weight during heat treatment. The residual NCO content decreases considerably after heat treatment compared to the initial value and is at the same level after both types of heat treatment. Since the use of dry air during the heat treatment results in a higher solution viscosity and a higher breaking strength, the reduction in the residual NCO content can be attributed to a linear molecular weight increase. In the case of the reduction in the residual NCO content after the heat treatment with ambient air, some of the NCO groups must accordingly also have reacted with water, which is undesirable. This is also demonstrated by the results of the GPC molar weight distribution, with a much higher molar weight of the sample that was heat-treated with dry air.

Example 7: Desmopan 9665DU: Production in a Reactive Extruder, Pelletization by Means of Strand Pelletization and Pre-Drying by Means of Vibrating Screen Extractor The TPU sample was divided and one portion of the TPU sample was heat-treated with ambient air and the other portion of the TPU sample was heat-treated with dry air, as described above.
Results:

TABLE 7

Results of the heat-treatment of Desmopan 9665DU with ambient air and dry air.

| Heat treatment with | Residual NCO content before heat treatment [% by wt.] | Solution viscosity | MVR (210° C.) [ml/10 min] | 100% modulus [MPa] | Breaking strength [MPa] | Elongation at break [%] |
| --- | --- | --- | --- | --- | --- | --- |
| Before heat treatment | 0.343 | | | | | |
| Ambient air | 0.126 | 1.50 | 12 | 27.6 | 53.0 | 836 |
| Dry air | 0.131 | 1.62 | 8 | 29.0 | 54.7 | 787 |

It can clearly be seen that a higher solution viscosity, a lower MVR value and higher breaking strength are obtained in the case of heat treatment with dry air. This points to a linear increase in the molar weight during heat treatment. The residual NCO content decreases considerably after heat treatment compared to the initial value and is at a similar level after both types of heat treatment. Since the use of dry air during the heat treatment results in a higher solution viscosity and a higher breaking strength, the reduction in the residual NCO content can be attributed to a linear molecular weight increase. In the case of the reduction in the residual NCO content after the heat treatment with ambient air, some of the NCO groups must accordingly also have reacted with water, which is undesirable.

Examples 1-7 reported clearly show the advantage gained when TPU samples are treated with dry air instead of ambient air.

The invention claimed is:

1. A process for the treatment of thermoplastic polyurethane, the treatment comprising:
   I) providing a thermoplastic polyurethane (TPU-1) obtained by reacting at least one polyisocyanate with at least one polyol, and
   II) subjecting the thermoplastic polyurethane (TPU-1) to a temperature in a range from 10° C. to 150° C. under a gas atmosphere, a gas of the gas atmosphere having a dew point of ≤−10° C., to obtain a treated thermoplastic polyurethane (TPU-2),
   wherein step II) is performed in an apparatus, wherein the apparatus is optionally a vessel or silo,
   wherein the thermoplastic polyurethane (TPU-1) is supplied to the apparatus for step II) via a hose and/or a pipeline, and
   wherein the hose and/or the pipeline each comprise a gas atmosphere and the gas of the gas atmosphere has a dew point of ≤−10° C.

2. The process as claimed in claim 1, wherein, prior to being provided in step I), the thermoplastic polyurethane (TPU-1) has undergone a multi-stage process comprising:
   a) extruding the thermoplastic polyurethane (TPU-1),
   b) pelletizing the extruded thermoplastic polyurethane (TPU-1) from step a), and
   c) drying the thermoplastic polyurethane (TPU-1) from step b).

3. The process as claimed in claim 1, wherein the gas of the gas atmosphere has a dew point of ≤−15° C.

4. The process as claimed in claim 1, wherein the thermoplastic polyurethane (TPU-1) is subjected to the temperature for a period of from 1 hour to 12 hours under gas atmosphere.

5. The process as claimed in claim 1, wherein the gas of the gas atmosphere is air, an inert gas, or a mixture of air and an inert gas.

6. The process as claimed in claim 1, wherein the dew point of the gas of the gas atmosphere in step II) is kept constant on entry into the apparatus.

7. The process as claimed in claim 1, wherein the pressure of the gas atmosphere is in the range from 0.01 bar absolute to 5.0 bar absolute.

8. The process as claimed in claim 1, wherein the gas of the gas atmosphere flows around the thermoplastic polyurethane (TPU-1 and TPU-2).

9. The process as claimed in claim 1, wherein a ratio of the volume of the gas of the gas atmosphere to the volume of the thermoplastic polyurethane (TPU-1) is in the range from 1 to 1000.

10. The process as claimed in claim 1, wherein the NCO group content of the thermoplastic polyurethane (TPU-2) is at least 30% lower than the NCO group content of the thermoplastic polyurethane (TPU-1), the NCO group content being determined in accordance with DIN EN ISO 14896.

11. The process as claimed in claim 1, wherein the thermoplastic polyurethane (TPU-1) is subjected to a temperature in the range from 20° C. to 150° C. under a gas atmosphere.

12. The process as claimed in claim 5, wherein the inert gas is selected from the group consisting of nitrogen, carbon dioxide, argon, and a mixture of at least two of these.

* * * * *